July 15, 1969     P. A. INKLAAR     3,455,483

FOAM-SINTERING MOLDING PROCESS AND PRODUCTS

Filed Nov. 3, 1964

INVENTOR
PETRUS ADAM INKLAAR
BY
ATTORNEY 3,455,483
**FOAM-SINTERING MOLDING PROCESS
AND PRODUCTS**
Petrus Adam Inklaar, Diepenveen, Netherlands, assignor to Vasco Industries Corp., New York, N.Y., a corporation of New York
Filed Nov. 3, 1964, Ser. No. 408,489
Int. Cl. B65d 1/42, 1/22
U.S. Cl. 220—71                                                           18 Claims

ABSTRACT OF THE DISCLOSURE

Containers, etc. are molded economically with relatively thick, strong wall structures by conducting heat from a heated molding surface having the configuration of the articles into a mixture of a finely divided polyethylene or like thermoplastic resin and a finely divided blowing agent kept distributed over the molding surface so that resin particles of the mixture are melted and coalesced thereover into a fused resin layer that is foamed in situ by decomposing particles of the blowing agent. The foamed resin will adhere strongly to a reinforcing metal frame embedded in it. Attractive laminated structures are produced by heating the mixture through a dense skin layer of similar resin previously sintered on the molding surface and sintering such a skin layer upon the foamed layer.

---

This invention relates to an improved process for the production of molded articles by the sintering of finely divided thermoplastic materials such as powdered polyethylenes, powdered nylon, or the like, and to new and improved molded articles as produced by the process.

It is known that containers and other articles having valuable qualities can be produced by fusing particles of a finely divided thermoplastic material such as a powdered polyethylene or powdered nylon on a heated molding surface having the configuration of the required article and cooling the dense fused wall structure thus formed. This process is known as sintering or sinter-molding. It can be carried out in various ways among which are the methods referred to as "static sintering" [Engel U.S. Patents Nos. 2,915,788 and 3,039,146], rotational molding, double (2-axis) rotational molding, and "rock and roll" molding [Knowles U.S. Patent No. 3,134,140].

In the practice of sinter-molding, the mold is heated externally to a temperature above the melting range of the thermoplastic powder while a mass of the powder is either held static against the molding surface or kept pouring over it by movement of the mold. An oven or external mold temperature of about 300° to 350° C. or higher is usually needed to give the required speed of molding. As particles of the material contacting the molding surface reach their melting temperature, they become plastic and coalesce into a layer covering the heated surface. With continuation of the heating, this layer increases in temperature and transmits heat to unfused thermoplastic particles continuing to contact it, thus gradually bringing these particles to plasticity and coalescing them into its structure until, after a suitable period of heating, a fused plastic layer or wall structure having the required final thickness is formed.

The present invention is concerned especially with certain limitations of the said process which heretofore have restricted its economy and the ranges of products to be manufactured by its use.

One of these limitations arises from the requirements and costs of the thermoplastic material. This material in a dense fused state makes up essentially the entire structure of the known sinter-molded products, and they become the heavier and more costly the larger they are or the thicker their walls must be in order to give them the required structural strength.

Another limitation arises from the fact that the wall thickness attainable in the products is restricted to one which will not slump in the mold in the course of the heating. The greater the wall thickness to be formed, the longer must be the heating at a given mold temperature; but as the heating period is increased, so also are the outside temperature and the mean temperature of the fused wall forming in the mold. Unless the heating period and thickness are properly restricted, the fused wall becomes too limp and will slump in the mold under its own weight. For instance, in the known manufacture of containers from low density polyethylene by static sintering, slumping commonly occurs before the fused wall reaches a thickness as great as 10 mm.

A further limitation arises from the fact that the thermoplastic material ordinarily will not form a durable unit with a reinforcing metal frame embedded in it by the sintering process. This makes the process unsatisfactory for the production of extraordinarily large containers or the like requiring a frame to give them rigidity. Although a wall of the thermoplastic material may be fused upon a frame of iron or steel, for example, the product so obtained ordinarily is susceptible to stress cracking, for as it is cooled in the mold, reheated or otherwise subjected to temperature changes great internal stresses develop in the sintered structure due to the different thermal expansions of the metal and the thermoplastic material.

It has now been discovered that the above-mentioned limitations can be alleviated and that valuable new sinter-molded products can be obtained by utilizing in the sintering process a powdery mixture of the finely divided thermoplastic material and a finely divided blowing agent that decomposes thermally to generate a gas at a temperature of the fused layer or wall structure being formed in the mold.

It has been found, surprisingly, that the presence of particles of such a blowing agent in the molding powder will bring about a "blowing up" or foaming of the fused wall structure as it is being formed so as to produce a foamed sintered layer or wall of the thermoplastic material which, although of far less density than the thermoplastic material itself, holds its shape during the heating required for its growth to a desired thickness and has a very high strength in relation to its density upon being cooled and removed from the mold.

Accordingly, by the use of this "foam sintering" process molded containers or the like having the required structural strength together with the corrosion resistance, durability and other valuable qualities of the thermoplastic material can be made from powdered polyethylenes, nylons, or the like, at but a fraction of the raw material costs and with but a fraction of the weight heretofore required.

Further, the foamed wall structure as it is being formed has been found to be sufficiently shape-retaining and tenacious that it can be built up to a thickness as great as or surpassing that attainable by known sintering practices, without slumping in the mold.

Still further, it has been found that the foamed sintered wall structure will unite tenaciously as it is formed with metal structures, for example, a reinforcing metal frame, embedded in it, so as to form a strong molded unit that with withstand the strains of cooling, reheating and other temperature changes without developing internal stresses conducive to stress cracking. It has been found that there is a remarkably low strinkage in the foam-sintered wall structure as it is cooled. The invention thus provides a way of producing valuable articles composed of integrated thermoplastic and metal structures. For example, reinforced containers or the like can be produced economically from powdered thermoplastic material in sizes and strengths and for uses not available heretofore.

In the practice of the invention, as for the manufacture of molded plastic containers, a hollow mold of sheet metal or the like shaped to the configuration of the article to be produced is charged with a mixture of the finely divided thermoplastic material and the finely divided blowing agent and then is heated externally at a temperature above the melting range of the thermoplastic material while the mixture is kept continually distributed over the inner surface of the mold.

As the heating progresses through the mold wall and from its inner surface to the material thereover, a coherent foamed fused layer of the thermoplastic material is built up over the heated molding surface by the fusion of particles of the thermoplastic material and the decompisition of particles of the blowing agent among the coalesced plastic particles. Upon subsequent cooling of the mold, this fused layer solidifies to become a tough foamed layer or wall structure having the body, thickness and strength required for the molded article.

The finely divided thermoplastic material to be used is one that will coalesce into a fused layer or film by melting. A powdered polyethylene or a powdered nylon is escpecially suitable, but use may also be made of other substances such as a powdered polystyrene or a powdered polyvinyl chloride of the kind termed "soft." Among suitable polyethylenes are those having melting indexes of 1, 2, 7 and 20 and densities of 0.918, 0.940 and 0.960.

The thermoplastic material ordinarily should be comminuted and screened to particle sizes in the range of about 20 to 100 mesh.

The mixture required according to the invention then can be obtain simply by mixing the finely divided thermoplastic material with a suitable blowing agent in dry powdery form. The concentration of the blowing agent can range from as little as about 0.25% of the weight of the thermoplastic material up to about 10% thereof, but for most practical purposes the amount of the blowing agent to be used is in the range of about 1 to 4%.

The blowing agent can be any of various known compounds that will decompose to generate gas at a temperature to be reached in the heated mold by the fused thermoplastic material of the mixture. Depending upon the melting point of the thermoplastic materal (i.e., the temperature at which particles of it begin to lose their identity) and the tempearture and duration of the heating of the mold, the decomposition temperature of the blowing agent can be from as low as about 100° C. up to nearly 400° C.

It has been found, surprisingly, that a blowing agent having a stated decomposition temperature even somewhat lower than the stated melting point of the thermoplastic material can be used successfully according to the invention. For example, a blowing agent having a stated decomposition temperature of 115° C. has been used successfully to produce foam-sintered articles both of low-density polyethylene having a stated melting point of approximately 110° C. and of high densty polyethylene having a stated melting point of approximately 125° C. The blowing agent can also be one decomposing at a temperature above the melting point of the thermoplastic material where the temperature will be reached in the fused material in the course of building up a layer of the required thickness in the mold.

Among the suitable blowing agents are, for example, the following nitrogen-liberating organic compounds:

(1) A substituted thiotriazole known as "Porofor T.R.," having a density of 1.5, a stated blowing (decomposition) temperature of 115° C., and a theoretical gas generation of 130 ml. per gram;

(2) A diphenylsulfonic 3,3'-disulfohydrazide known as "Porofor D33," having a density of 1.6, a stated blowing (decomposition) tempearture of 155° C., and a theoretical gas geneartion of 110 ml. per gram;

(3) A sulfohydrazide compound known as "Porofor S44," having a density of 1.6, a blowing (decomposition) temperature of about 175° C., and a theoretical gas generation of about 120 ml. per gram; and (4) An azodicarbonamide known as "Porofor ADC," having a density of 1.6, a stated blowing (decomposition) tempearture of about 210° C., and a theoretical gas generation of about 190 ml. per gram.

The quantity of the mixture to be charged into the mold and the manner of keeping it distributed over the molding surface depend upon the method of sinter-molding to be employed. For example, if the molding is to be by "static sintering," the mold ordinarily will be filled to the brim with the mixture. If simple rotational molding on one axis is to be used, the mold ordinarily will be filled incompletely yet more than half-full with the mixture and will be kept in rotation during the heating so as to keep the mixture distributed over the molding surface. If the molding is to be by rotation of the mold about two axes simultaneously, or by rotating it about one axis while rocking it on a cross axis, a measured charge of the mixture corresponding to the amount of it to be formed into the molded article can be introduced into the mold before the heating. The complex movement or revolutions of the mold then will keep the mixture continually distributed over the molding surface while the fusion and foaming of the thermoplastic material take place.

In practices of the invention in which the foamed layer of thermoplastic material constitutes the entire molded wall structure of the container or other molded article, the product obtained may have the required shape and strength and other desirable qualities intrinsic in the thermoplastic material, but its exposed surfaces will present a somewhat porous or irregular texture that tends to detract from its appearance and thus from its attractiveness for certain uses.

According to another feature of the invention, it has been found that this porous appearance can be eliminated and yet the advantages of the foamed wall structure essentially retained by sintering successive charges of finely divided thermoplastic material, one upon and fused with another in the same mold, with at least one of the charges composed of a mixture of the kind described to form a foamed layer in the mold and at least one other charge being composed of a finely divided thermoplastic material without a blowing agent to form a relatively dense covering skin integral with the inside or the outside, or over both sides, of the foamed layer.

The first charge may be composed of thermoplastic powder only, formed into a dense fused skin layer on the heated mold surface. It may be followed by a charge of the described mixture, which will form a foamed layer over and integral with the skin layer. Then a third charge of thermoplastic powder only may be introduced into the mold and fused upon the inside of the foamed layer to give the molded article a dense smooth structure of pleasing appearance over its inner side as well as its outer side, even though its wall thickness is largely made up of the intervening foamed layer of relatively low density.

Another advantage of the process making use of one or more skin forming charges in each molding cycle is that the thermoplastic material to be used for the foamed layer and for the covering skin or skins can be choosen so as to give the molded article any of various desirable combinations of physical characteristics.

For example, the article may be formed of a dense outer skin of sintered high density polyethylene having sintered thereover a foamed layer of sintered low density polyethylene which in turn has sintered over its inner side a dense skin of low density polyethylene, or the outer skin may be of low density polyethylene, the foamed layer of high density polyethylene, and the inner skin of high density polyethylene; or both the outer skin and the foamed layer may be of high density polyethylene and the inner skin of low density polyethylene. The other possible permutations can be used as well, all without difficulties resulting from the different characteristics of the thermoplastic materials employed.

According to further important embodiments of the invention, use is made of the discovery that the foamed sintered wall structure obtained as herein described will unite tenaciously and stay strongly bonded with a reinforcing frame present in the mold where the foamed layer is being formed, so as to provide durable sinter-molded articles of greater size or greater rigidity than those attainable by known techniques.

In a process making use of this discovery a frame made of strips of iron, steel or other suitable metal for reinforcing the article to be produced is arranged in closely spaced relation to the inner surface of a mold having the configuration of the article, after which the mold is charged with a mixture of a finely divided thermoplastic material and a finely divided blowing agent, of the character already described, and is heated externally until a foamed fused layer of the thermoplastic material is formed over the molding surface to a thickness embedding the frame.

Again, it is usually advantageous to form dense skin layers of fused thermoplastic material in the mold before and after the formation of the foamed layer therein, so that the product obtained upon the cooling of the mold will have the skin layers and the foamed layer solidified in union with one another, with the frame embedded in the foamed layer.

The production of containers of foam-sintered polyethylene or the like reinforced by sintered in frames as herein set forth offers many advantages. The containers can be made far larger than has been practicable heretofore. The cost of producing them is considerable lower than would be the cost of producing similarly sized containers with dense thermoplastic walls of the same thickness. Their inner and outer surfaces are composed entirely of thermoplastic material that can be selected to give them the qualities such as of chemical resistance required for their intended use, without limitations by the absence of such qualities in the embedded frames. The foamed wall structure gives the containers an extraordinarily high heat insulating capacity, or low thermal conductivity, which is important in uses of them for holding heated or refrigerated liquid baths. The frames keep them in required shape under heavy loads or during wide temperature changes; yet there is no trouble from stress cracking. Moreover, the sintered-in frames provide a means of supporting various auxiliary structures to be attached to or formed in the containers. For example, doors can be mounted on the frames; hooks can be attached to them to enable the hoisting of large transport containers produced according to the invention.

The principles of the invention and suitable ways of practicing it will be further evident from the following detailed examples, which are intended to be illustrative and not as limitations upon its scope.

Example 1

A sheet metal mold of cubic form having an open top and dimensions of 50 x 50 x 50 cm. was filled to the brim with a mixture of powdered low density polyethylene [density 0.918, melting index 2] and 2% by weight of a powdered blowing agent [Porofor D33] having a stated decomposition temperature of 155° C.

The filled mold was placed in an oven at a temperature of 325° C. and heated therein for 12 minutes. Then it was removed from the oven, the unsintered powder was removed, and the mold was cooled in the air. A foamed sintered layer of the polyethylene had formed to a considerable thickness over the entire inside of the mold. Due to the heat contained in this layer, its inner surface became smooth before cooling.

After the cooling, a container of good quality constituted by the foam polyethylene layer was readily removed from the mold. The product was found to have densities of 0.31, 0.32, 0.33 and 0.31 at different locations on its side walls, of 0.32, 0.34, 0.32 and 0.33 at different locations on its bottom wall. The thickness of the side walls was 9.2 mm.±0.1 mm. and the thickness of the bottom wall was 9.0 mm.±0.1 mm.

The foamed bottom wall appeared to have a slightly higher density as a result of the weight of the mass of powder resting upon it as it formed in the mold.

Example 2

A. A mold of the form and dimensions mentioned in Example 1 was mounted on a shaft so as to be rotatable about a central axis. The mold was charged until three-fourths full with a mixture of powdered low density polyethylene [density 0.918, melting index 2] and 2% by weight of a powdered blowing agent [Porofor T.R.] having a stated decomposition temperature of 115° C. A lid insulated by a layer of asbestos was then applied to close the open top of the mold, and the assembly was placed in an oven at a temperature of 300° C. and rotated therein, at a rate of 1 r.p.m. for 14 minutes. Then the mold was taken out of the oven and the unsintered powder was removed.

After the cooling, a container having a foamed sintered wall structure was readily removable from the mold. The side wall and bottom wall thicknesses of this product were all in the range of 8.2–8.4 mm. The density of the foamed wall structure was 0.31±0.02.

B. The same operations as described in Example 2A were performed with the use of a mixture of low density polyethylene powder having a melting index of 7 with 2% of a blowing agent having a stated decomposition temperature of 155° C. In this case also a molded container of excellent quality was obtained, having a sturdy foamed wall structure of substantially uniform thickness and yet of relatively low density and light weight.

C. Operations as described in Example 2A were repeated with the use of a cylindrical mold having a height of 65 cm. and a diameter of 38 cm., instead of a mold of cubic form. Again, a container of excellent quality was obtained, which was composed of a sturdy foamed layer of the polyethylene having a substantially uniform thickness and a low density.

Example 3

Operations as described in Example 2A were performed with prolongation of the heating in the oven, in order to increase the thickness of the foamed wall structure built up in the mold. The heating period was doubled, to last for 28 minutes instead of 14 minutes. Nevertheless, a container of excellent quality was obtained, having thicknesses of 12.5–12.7 mm. in its side walls and of 12.4–12.6 mm. in its bottom wall. There was no evidence of slumping having occurred in the mold.

The wall thickness so obtained was considerably greater than is feasible according to known sinter-molding techniques. The thickness did not increase in direct proportion to the increase of the heating period, due to the relatively low heat conductivity of the foamed thermoplastic material on the heated molding surface.

Example 4

A. Operations as described in Example 2A were performed by the use of a mixture of powdered high density polyethylene [density 0.94, melting index 6] with 2% of a powdered blowing agent having a stated decomposition temperature of 155° C. Again, a container of good quality was obtained. Its foamed wall structure had a density of 0.42±0.03.

B. The same operations were performed by the use of a mixture of another powdered high density polyethylene [density 0.950, melting index 3] with 2% of the same blowing agent. Again, a container of good quality was obtained, the foamed wall structure of which had a density of 0.46±0.04.

C. The same operations as described in Example 4A were performed with the blowing agent present in the mixture at a concentration of 3% instead of 2%. Again, a container of good quality was obtained. Its foamed wall structure had a density of 0.32±0.04.

Example 5

Operations as described in Example 1 were repeated with the use of a mixture of powdered nylon 11 (Rilsan) with 2% of a powdered blowing agent [Porofor ADC] having a stated decomposition temperature of about 210–215° C. A container having a foamed wall structure of excellent quality was obtained, the density of this structure being 0.8.

Example 6

A sheet metal mold shaped to the configuration of a container was filled to the brim with powdered high density polyethylene [density 0.941, melting index 6]. The mold was then heated externally in an oven at 320° C. for 2 minutes to form a fused skin layer of the high density polyethylene over its inner surface.

Then the unfused powder was removed and the mold was again filled to the brim, this time with a mixture of powdered low density polyethylene [density 0.918, melting index 2] with 2% of a blowing agent having a stated decomposition temperature of 115° C. The refilled mold was now heated in the same oven for 6 minutes, whereupon it was again emptied of unfused powder and then filled with a third charge composed of another low density polyethylene [density 0.918, melting index 7].

After a third heating period of 2 minutes in the oven, the mold was removed from the oven, emptied of unfused powder, and returned to the oven for a further heating period of 2 minutes to smoothen the inner surface of the fused plastic wall structure formed therein. Then the mold was cooled in the air, and the product was removed.

In this way, a container was obtained having dense skin layers of approximately 1 mm. in thickness over its inner and outer sides and having a foamed layer of approximately 6 mm. in thickness between the skins. Each skin was inseparably united with the foamed layer. Both the inside and the outside of the container presented smooth surfaces giving no impression of the presence of a foamed layer or of porosity in the wall structure.

Essentially the same operations were performed with like results by the use of other combinations of polyethylene to form sintered products composed of skin layers having foamed layers sandwiched inseparably between them. An outer skin layer of sintered low density polyethylene was united with a foamed sintered layer of high density polyethylene, which in turn was covered by a skin layer of sintered high density polyethylene. An outer skin layer of high density polyethylene was united with a foamed sintered layer of high density polyethylene covered by an inner skin layer of low density polyethylene. These operations and others using still other combinations of materials for the successive charges of the mold proceeded in each case without difficulties, and in each case a distinctive laminar foamed product of good quality was obtained.

Example 7

A. A cylindrical hollow mold of 75 cm. in length and 35 cm. in diameter was formed with a central aperture of 10 cm. diameter in one end, through which powder could be charged into the mold. The mold was charged with 2.0 kg. of low density polyethylene powder [density 0.918, melting index 2] and then was heated by external flames for 3 minutes while being rolled about its longitudinal axis and rocked about a cross axis on an apparatus according to the above-mentioned Knowles patent.

Then, without interrupting the movements, a further charge of 2 kg. of the low density polyethylene powder mixed with 2% of a powdered blowing agent having a stated decomposition temperature of 115° C. was introduced into the mold through its end opening, and the heating was continued for a further period of 14 minutes.

Then a third charge of 2.0 kg. of the low density polyethylene powder alone was introduced, and the heating was continued for 5 minutes longer. The heating was then discontinued, and the mold was cooled in the air while being continued in rotation. It was then removed from the apparatus and the molded product was removed from it.

The product was a cylindrical container having an aperture 10 cm. wide in one end, obtained by sintering 6.0 kg. of polyethylene in a total heating period of 21 minutes. The wall structure was composed of smooth outer and inner skin layers, each approximately 2 mm. thick, united with an intervening foamed layer approximately 6 mm. thick. The container had an excellent appearance and excellent physical qualities.

B. Operations similar to those described in Example 7A were carried out, and products of essentially the same nature were obtained by use of the double rotation method of molding.

While in the use of that method, the mold ordinarily must be stopped and opened after the sintering of each charge of the molding powder in order to bring the next charge into the mold, this handicap can be overcome by use of the technique disclosed in a copending patent application of Lars Ringdal, Ser. No. 144,171, now United States Patent No. 3,202,745, assigned to the assignee of the present application. Thus, the charges of molding powder to be formed into the foamed layer and the inner skin layer of the product can be stored in the mold at locations away from its heated surface until the outer skin layer is formed and can each be released after a suitable interval so as to be distributed and fused over the molding surface after the preceding charge has been fused thereover.

Example 8

A sheet metal mold of hexahedral form having inside dimensions of 100 x 100 x 100 cm. and having a central opening of 50 cm. in diameter in one end is provided for the production of molded polyethylene containers capable of holding at least 900 liters of acid or other corrosive liquid.

The wall thickness required in order to produce such containers from polyethylene alone with the strengths necessary for the avoidance of deformation in service would make the cost of the containers prohibitive. Yet it has not been practical heretofore to use relatively inexpensive frames of iron or the like in making such containers, due to the necessity either to provide the frames with protective coatings and then join them with the molded wall structure of the containers or to embed them in those wall structures. The latter has not been practical because of the tendency of the product to undergo cracking, due to the very great difference (approximately 10- fold) in the coefficients of thermal expansion of, for example, iron and polyethylene.

A reticulated frame having outside dimensions 5 mm. smaller than the inside dimensions of the mold was made out of molded steel strips 4 mm. thick and 25 mm. wide. This frame was fixed in the mold with its elements evenly spaced from the inner surface of the mold. Then the mold was mounted in supporting rings, placed on a "rock and roll" molding apparatus, charged with 15 kg. of powdered high density polyethlene [density 0.950, melting index 3], and heated by external flames while being rocked and rolled on the apparatus.

After 4.5 minutes of the heating, 13 kg. of a mixture of low density polyethylene powder [density 0.918, melting index 2] with 2% of a powdered blowing agent having a stated decomposition temperature of 115° C. was introduced into the mold, and the heating and movement were continued for 20 minutes.

Then 10 kg. of the said high density polyethylene powder was charged into the mold and the heating and movements were continued for a further period of 15 minutes. The heating was then stopped and the mold in continued rotation was cooled by air streams blown against it.

After the cooling, the mold was taken off the molding apparatus, and a massive molded polyethylene container having extraordinary qualities of strength and durability was removed from the mold. The frame was embedded in and firmly united with a foamed layer of polyethylene approximately 8 mm. thick, which in turn was united over its outer and inner sides with skin layers approximately 3 mm. resp. 2 mm. thick. The skin layers presented smooth outer surfaces and made the presence of the frame hardly perceptible to the eye. Although the frame was strongly joined with the embedding foamed layer, there was no evidence of stresses likely to cause cracking or other defects in the molded wall structure.

The accompanying drawing presents schematic illustrations of molding operations being performed and of certain molded products obtained according to the invention. In the drawing.

Figure 1A:
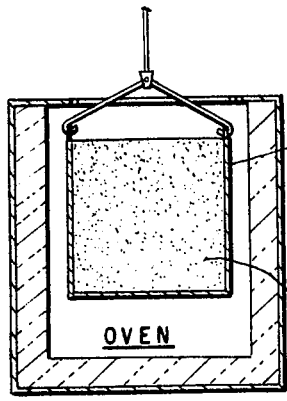
FIG. 1a is a schematic view of a molding operation according to Example 1.
Figure 2B:
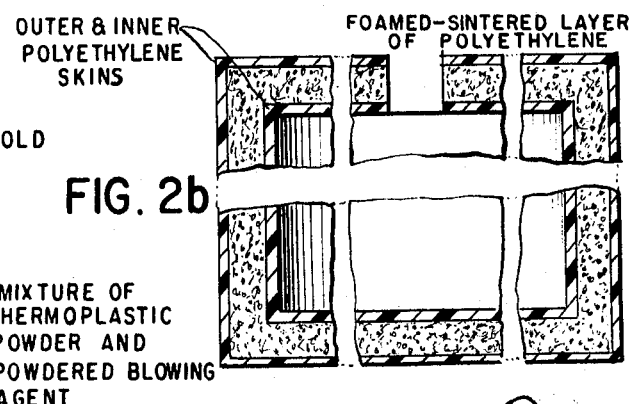
FIG. 2b is a schematic cross-sectional view of a laminar molded product as obtained by such operations.
Figure 1B:
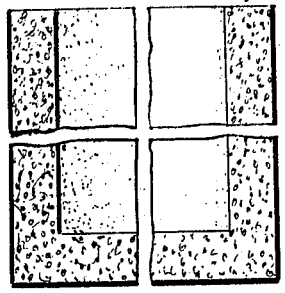
FIG. 1b is a schematic cross-sectional view of a molded container of foamed thermoplastic material as produced by such operation.
Figure 2A:
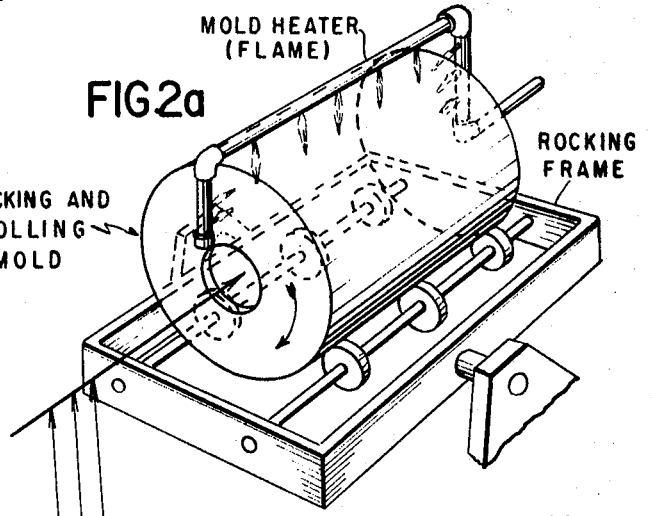
FIG. 2a is a schematic view of molding operations according to Example 7.
Figure 3:
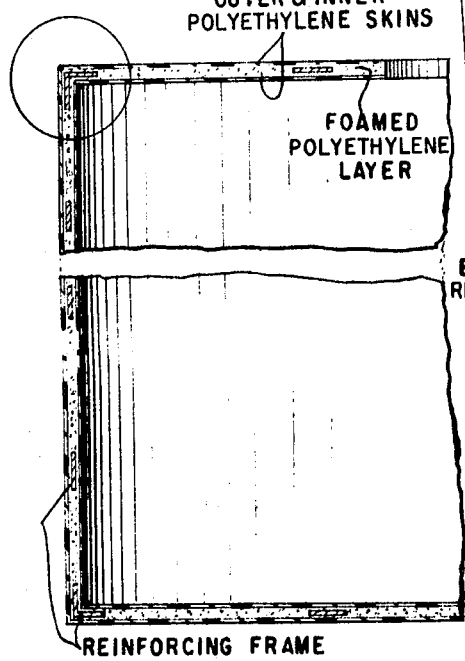
FIG. 3 is a schematic cross-sectional view of a reinforced molded container as produced according to Example 8.
Figure 4:
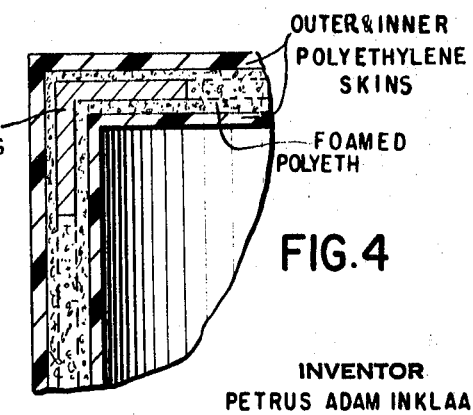
FIG. 4 is an enlarged schematic view of a portion of said container indicated within the circle on FIG. 3.

While various details and particulars of preferred embodiments of the invention have been described hereinabove and illustrated in the accompanying drawings, it will be understood that the invention may be practiced in various other ways and for the production of molded containers and other articles having wide varieties of forms, without departing from the contributions herein set forth and defined by the appended claims.

What is claimed is:

1. A process for producing a molded hollow article, which comprises charging a hollow mold the inner surface of which has the configuration of the article to be produced with a powdery mixture consisting of a finely divided polyethylene resin the particles of which will coalesce into a shape-retaining coherent fused layer upon being at least partially melted together and a finely divided blowing agent that will decompose to generate gas at a temperature of such fused layer; while keeping said mixture continually distributed over said surface, heating the mold externally at a temperature above the melting range of said resin and thus heating said mixture through said mold by conduction from said surface until a shape-retaining coherent foamed fused layer of said resin having said configuration is formed over said surface by the coalescence of at least partially molten particles of said resin and the decomposition of particles of said blowing agent among such coalesced molten resin particles; then introducing into said mold a charge consisting of a powdered polyethylene and while keeping the particles of said charge continually distributed over the inner surface of said foamed layer heating them by heat conduction through said foamed fused layer until they are formed into a dense skin layer covering and united with the inner surface of said foamed fused layer; and thereafter cooling the mold to solidify said layers therein.

2. A process according to claim 1, the decomposition temperature of said blowing agent being substantially above the melting point of said thermoplastic resin and the heating being continued until said mixture has a temperature above said decomposition temperature, whereby said mixture is coalesced into a dense fused layer which thereafter is foamed in situ by decomposition of said blowing agent.

3. A process according to claim 1, the particles of said thermoplastic resin being substantially entirely in the size range of about 20 to 100 mesh and being mixed with about 1 to 4 percent by weight of said blowing agent.

4. A process according to claim 1, the thermoplastic resin of said mixture being a low-density polyethylene.

5. A process according to claim 1, the thermoplastic resin of said mixture being a high-density polyethylene.

6. A process for producing a molded article from finely divided thermoplastic material, which comprises fusing successively a plurality of separate charges of finely divided thermoplastic material to form respective fused layers thereof, one upon and fused with another, over the inner surface of a hollow mold having the configuration of the article to be produced, each of said charges being so fused by revolving the mold containing it so as to keep the particles of the charge continually tumbling over said surface while heating the mold externally at a temperature above the melting range of the material of the charge until the heat passed through the mold and by conduction from said surface has coalesced such particles into a shape-retaining coherent fused layer of required thickness over said surface; and after the fusion of all of said charges cooling the mold to solidify said fused layers and removing the resulting article from the mold; one of said charges being a powdery mixture consisting essentially of a finely divided thermoplastic resin the particles of which will coalesce into a coherent shape-retaining fused layer upon being at least partially melted together and a finely divided blowing agent that decomposes to generate a gas at a temperature of the fused layer formed from said mixture, whereby the coalesced thermoplastic resin of said mixture is foamed in situ to form a foamed fused layer of said resin united with and having a substantially lower density than each other of said fused layers, the first of said charges consisting substantially entirely of finely divided thermoplastic resin and being formed into a dense skin layer on said surface, the second of said charges being said mixture and being formed into said foamed layer over and in union with the inside of said skin layer by heat conduction through said skin layer, and a third of said charges consisting substantially entirely of finely divided thermoplastic resin and being formed, by heat conduction through both said skin layer and said foamed layer, into a dense skin layer over and in union with the inside of said foamed layer.

7. A process according to claim 6, the thermoplastic resin of each of said charges being a polyethylene.

8. A process according to claim 6, the thermoplastic resin of said first charge being a high-density polyethylene and that of each other of said charges being a low-density polyethylene.

9. A process according to claim 6, the thermoplastic

11 resin of said first charge being a low-density polyethylene and that of each other of said charges being a high-density polyethylene.

10. A process according to claim 6, the thermoplastic resin of said first and second charges being a high-density polyethylene and that of said third charge being a low-density polyethylene.

11. A molded article constituted by a laminated wall structure composed of separate sinter-molded dense skin layers each consisting essentially of thermoplastic resin, said layers being respectively united in situ with the opposite faces of a thicker sinter-molded foamed layer consisting essentially of foamed thermoplastic resin, the density of said foamed layer being substantially lower than that of either of said skin layers, as produced by the process of claim 6.

12. A process for producing a molded article from finely divided thermoplastic material, which comprises fusing successively a plurality of separate charges of finely divided polyethylene to form respective fused layers thereof, one upon and fused with another, over the inner surface of a hollow mold having the configuration of the article to be produced, each of said charges being so fused by revolving the mold containing it so as to keep the particles of the charge continually tumbling over said surface while heating the mold externally at a temperature above the melting range of the polyethylene of the charge until the heat passed through the mold and by conduction from said surface has coalesced such particles into a shape-retaining coherent fused layer of required thickness over said surface; and after the fusion of all of said charges, without previously having cooled the mold below the melting range of the resin of any said charges, cooling the mold to solidify said fused layers and removing the resulting article from the mold; the second of said charges being a powdery mixture consisting of a finely divided polyethylene resin the particles of which will coalesce into a coherent shape-retaining fused layer upon being at least partially melted together and a finely divided blowing agent that decomposes to generate a gas at a temperature of the fused layer formed from said mixture, whereby the coalesced thermoplastic resin of said mixture is foamed in situ to form a foamed fused layer of said resin united with and having a substantially lower density than each other of said fused layers.

13. A molded hollow article such as a container, constituted by a laminated wall structure composed of separate sinter-molded dense skin layers each consisting essentially of polyethylene, said layers being facially united in situ with the opposite faces of a thicker sinter-molded foamed layer consisting essentially of foamed polyethylene, the density of said foamed layer being substantially lower than that of either of said skin layers, as produced by the process of claim 12.

14. A process for producing a molded article composed of integrated metal and plastic structures, which comprises arranging a reticulate metal structure in closely spaced relation to the inner surface of a hollow mold having the configuration of the article to be produced; thereafter charging the mold with a finely divided mixture consisting essentially of a finely divided polyethylene the particles of which will coalesce into a shape-retaining coherent fused layer upon being at least partially melted together and a finely divided blowing agent that will decompose to generate gas at a temperature of such fused layer; while keep said mixture continually distributed over both said surface and said metal structure heating the mold externally at a temperature above the melting range of said polyethylene and thus heating said mixture through the mold and by conduction from said surface until a shape-retaining coherent foamed fused layer of said polyethylene is formed over said surface to a thickness embedding said metal structure by the coalescence of at least partially molten particles of said polyethylene and the decomposition of particles of said blowing agent

12 among such coalesced molten polyethylene particles; and thereafter cooling the mold to solidify said foamed layer therein in union with said metal structure.

15. A molded article constituted by a reinforced plastic wall structure at least a major part of the thickness of which is composed of a sinter-molded foamed layer consisting essentially of foamed polyethylene and having a reinforcing reticulate metal structure embedded in and bonded in situ directly to said foamed polyethylene, as produced by a process according to claim 14.

16. A process for producing a molded laminated article composed of integrated metal and plastic structures, which comprises arranging a reticulate metal structure in closely spaced relation to the inner surface of a hollow mold having the configuration of the article to be produced; thereafter fusing in the mold, successively, a plurality of separate charges of finely divided polyethylene to form respective fused layers thereof, one upon and fused with another, over said surface, each of said charges being so fused by keeping particles of the charge continually distributed over said surface while heating the mold externally at a temperature above the melting range of the resin of the charge until heat passed through the mold and by conduction from said surface has coalesced such particles into a layer of required thickness thereover; the first of said charges consisting substantially entirely of a finely divided polyethylene the particles of which will coalesce into a shape-retaining coherent fused layer upon being at least partially melted together, said first charge being formed into a dense fused skin layer of said polyethylene on said surface in the space between said surface and said metal structure; the second of said charges being a finely divided mixture consisting essentially of a finely divided polyethylene and a finely divided blowing agent that decomposes to generate a gas at a temperature of the fused layer formed from said mixture, and being heated by conduction from said surface through said skin layer until a shape-retaining coherent foamed fused layer of the polyethylene is formed over and in union with said skin layer, to a thickness embedding said metal structure, by the coalescence of at least partially molten particles of the polyethylene and the decomposition of particles of said blowing agent among such coalesced molten polyethylene particles; a third of said charges consisting substantially entirely of a finely divided polyethylene and being heated by conduction from said surface through said skin layer and said foamed layer until a dense fused skin layer of the polyethylene is formed over the inside of and in union with said foamed layer; and after the fusions cooling the mold to solidify said fused layers in union with one another and with said metal structure and removing the resulting article from the mold.

17. A process according to claim 16, said metal structure being a reinforcing frame giving said article desired rigidity.

18. A molded article constituted by a reinforced laminated wall structure composed of separate sinter-molded dense skin layers, each consisting essentially of polyethylene, respectively united in situ with the opposite faces of a thicker sinter-molded foamed layer consisting essentially of foamed polyethylene having a reinforcing reticulate metal structure embedded in and bonded in situ directly to said foamed polyethylene, as produced by the process of claim 16.

References Cited

UNITED STATES PATENTS

| 2,950,505 | 8/1960 | Frank | 264—45 |
| 3,013,306 | 12/1961 | Richie et al. | 229—1.5 |
| 2,695,425 | 11/1964 | Stott | 264—126 |
| 2,736,925 | 3/1956 | Heisler et al. | 264—126 |
| 3,045,058 | 7/1962 | Martinak | 264—126 |

(Other references on following page)

UNITED STATES PATENTS

| | | | |
|---|---|---|---|
| 3,082,485 | 3/1963 | Thomas | 264—127 |
| 3,128,262 | 4/1964 | Lightfoot | 264—41 |
| 3,192,294 | 6/1965 | Streed et al. | 264—54 |
| 3,202,745 | 8/1965 | Ringdal | 264—126 |
| 3,270,103 | 8/1966 | Kurtz | 264—45 |
| 3,091,998 | 6/1963 | Wehr et al. | 264—45 XR |
| 3,211,605 | 10/1965 | Spaak et al. | 264—321 XR |

FOREIGN PATENTS 585,395    2/1947    Great Britain.

PHILIP E. ANDERSON, Primary Examiner

U.S. Cl. X.R.

18—5, 26; 161—160; 220—9, 83; 260—2.5; 264—45, 54, 126, 271, 310